UNITED STATES PATENT OFFICE.

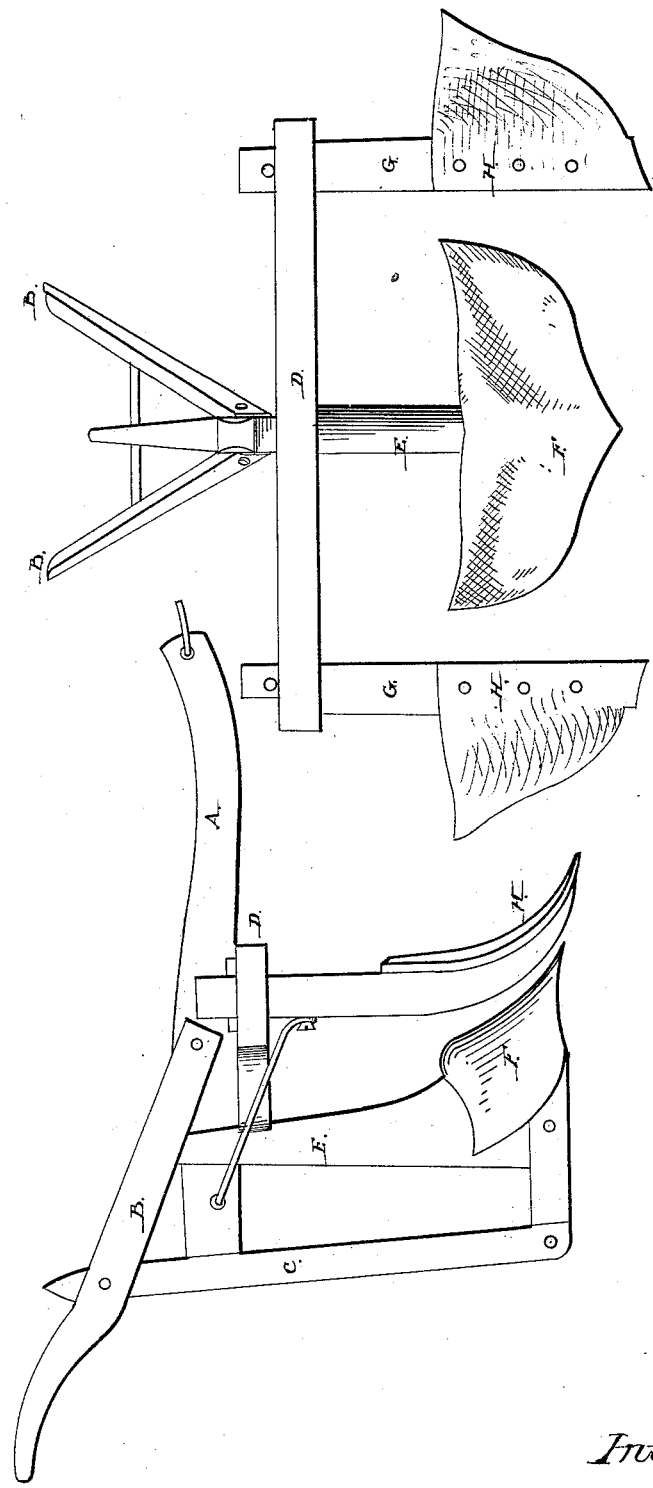

F. O. WILSON, OF MOUNT OLIVE, NORTH CAROLINA.

IMPROVEMENT IN CULTIVATORS.

Specification forming part of Letters Patent No. 27,402, dated March 6, 1860.

*To all whom it may concern:*

Be it known that I, F. O. WILSON, of Mount Olive, in the county of Wayne and State of North Carolina, have invented certain new and useful Improvements in Cultivators; and I do hereby declare the following to be a full, clear, and exact description of the same, reference being had to the accompanying drawings and the letters of reference marked threon.

The nature of my invention consists in the peculiar construction and arrangement of such devices to accomplish the particular object which will be hereinafter fully set forth.

To enable others skilled in the art to make and use my invention, I will proceed to describe its construction and operation.

Figure 1 is a side elevation. Fig. 2 is a front elevation.

In Fig. 1, A represents the beam; B B, the handles, which are securely fastened to beam A.

C is a brace or stay the bottom of which is mortised and fits on a tenon of the heel of the middle stock. The end of beam A is also provided with a tenon, which fits into a mortise in brace C. The handles are supported by means of a round passing from one to the other through said brace. Thus the whole frame may be firmly united. D represents a cross-frame the length of which must be regulated according to the width of the corn or cotton rows you are cultivating.

E represents the middle stock, the top of which is secured to beam A, while its bottom is supported by means of brace or stay C, as already shown.

F represents a double-mold turn-plow, which is securely fastened to the middle stock, E, as fully shown in the drawings. I construct this plow much shorter than usual, in order that the dirt may pass over its top, and thus effect more perfectly the object in view. This, however, will be more clearly seen hereinafter. G G are two side stocks, upon which are secured the two side turn-plows, H H, as seen in Fig. 2. The distance of these two plows apart, as before hinted, will be regulated by the width of the rows.

It will be particularly observed that the width of the double-mold turn-plow F must be precisely or very near the distance which the two side plows are located from each other. Thus it will be seen in the operation of my machine that as the two side plows loosen the earth at the roots of the corn or cotton and destroy the weeds or grass the double-mold turn-plow advances and fills up the furrows created and leaves a shallow furrow in the center of the two rows.

I am fully aware that this mode alone of arranging the plows is not new, and therefore lay no claim to their relative position; but it will be particularly noticed that the invention which exhibits three plows arranged in this manner has not for its object, nor can it perform the same result for which mine is designed, inasmuch as a common shovel-plow has hitherto been employed instead of a double-mold turn-plow. Thus with the use of a shovel-plow only the furrows are not filled up, and consequently the roots of the corn or cotton remain exposed, which of course is very hurtful to either or both.

The object in my making the double-mold turn-plow shorter than usual is that the dirt may fall behind it and thus in some degree fill up the deep furrow which it makes, but at the same time will leave a furrow sufficiently deep for drainage.

Having thus fully described my invention, what I claim, and desire to secure by Letters Patent, is—

The double-mold turn-plow F and the side turn-plows, H H, in combination with the beam A, middle stock, E, cross-frame D, and side stocks, G G, when said beam A and middle stock, E, shall be braced and supported by the stay C, and the other parts constructed and arranged substantially as and for the purpose specified.

F. O. WILSON.

Witnesses:
T. H. ALEXANDER,
M. V. B. RADCLIFF.